United States Patent [19]

Youngblood

[11] 4,194,755

[45] Mar. 25, 1980

[54] TOW BAR FOR VEHICLES

[76] Inventor: John W. Youngblood, 3201 Franklin Ave., Waco, Tex. 76710

[21] Appl. No.: 926,508

[22] Filed: Jul. 20, 1978

Related U.S. Application Data

[63] Continuation-in-part of Ser. No. 894,783, Apr. 10, 1978.

[51] Int. Cl.$^2$ .......................... B60P 3/06; B62D 53/04
[52] U.S. Cl. ................................. 280/402; 280/491 B
[58] Field of Search ............. 280/402, 491 R, 491 B, 280/462, 482; 214/86 A; 414/563

[56] References Cited

U.S. PATENT DOCUMENTS

| | | | |
|---|---|---|---|
| 2,823,930 | 2/1958 | Cooper | 280/491 B |
| 2,830,829 | 4/1958 | Gensinger | 280/491 R |
| 2,880,016 | 3/1959 | Peterson | 280/482 X |

*Primary Examiner*—John A. Pekar
*Attorney, Agent, or Firm*—Gerald G. Crutsinger; John F. Booth; Harry C. Post, III

[57] ABSTRACT

A self storing tow bar which is connectable to a front wheel drive vehicle for maintaining the front wheels of the vehicle in an elevated position above a roadway while the vehicle is being towed behind another vehicle to minimize wear on the universal joints and transmission of the towed vehicle. The tow bar comprises a tongue portion having an upwardly inclined tongue extension connector secured to the front end thereof and a suspension support beam secured to the opposite end thereof. The tongue extension connector is adapted to receive an adjustable tongue extension piece. The tongue extension piece comprises a clevis to pivotally secure the extension bar to a trailer coupling secured to the outer end thereof which is connectable to a conventional coupling hitch ball on a trailer hitch. The extension bar is movable from a generally horizontal position to a generally vertical position on the vehicle such that the hitch may be stored in an out of the way position without removing it from the vehicle. The suspension support beam has suspension support pins moveably secured to opposite ends thereof adapted to be actuated to engage the front wheel suspension mechanism of a vehicle for maintaining the front wheels of the vehicle elevated above the roadway while the vehicle is being towed.

5 Claims, 9 Drawing Figures

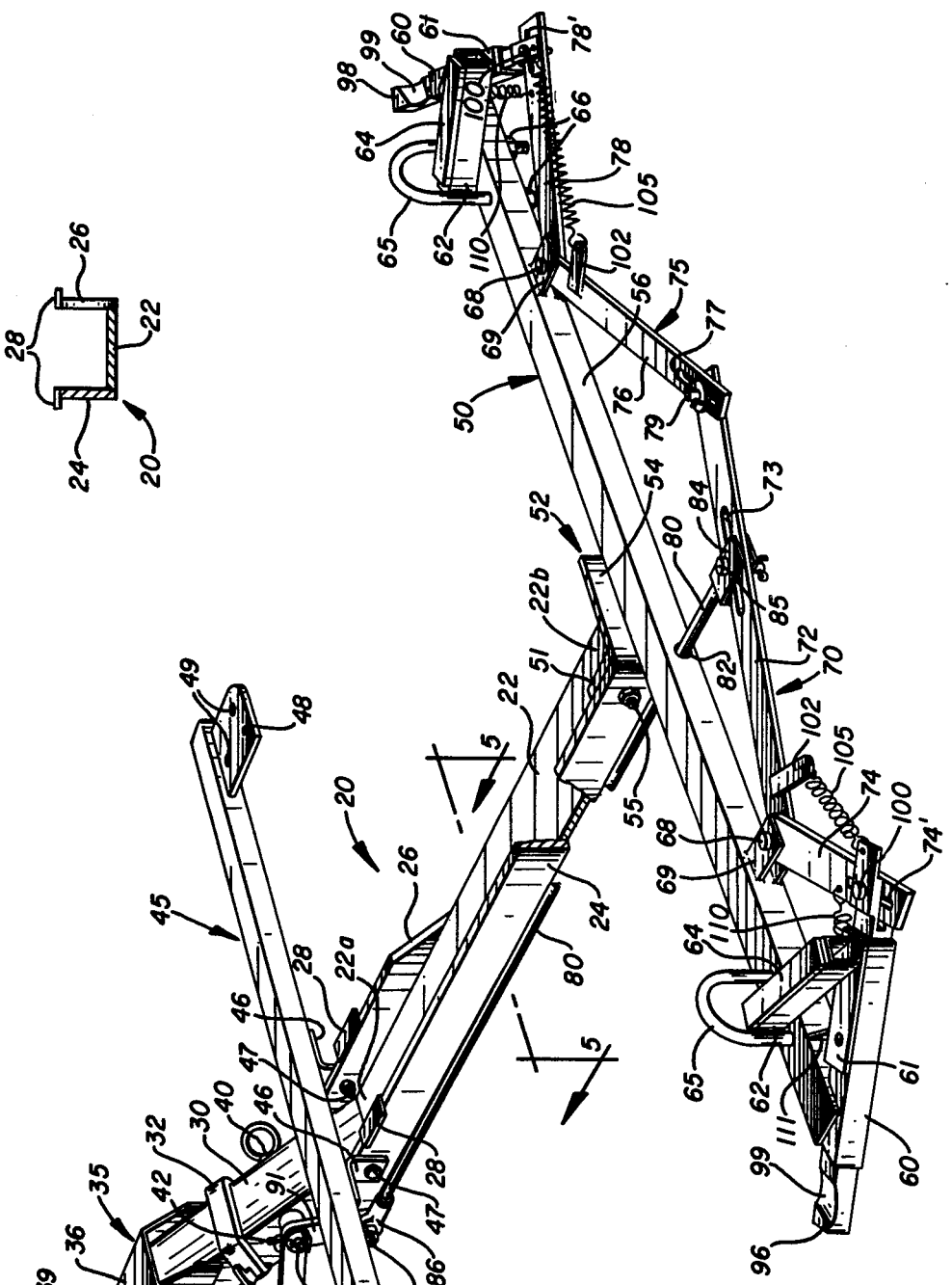

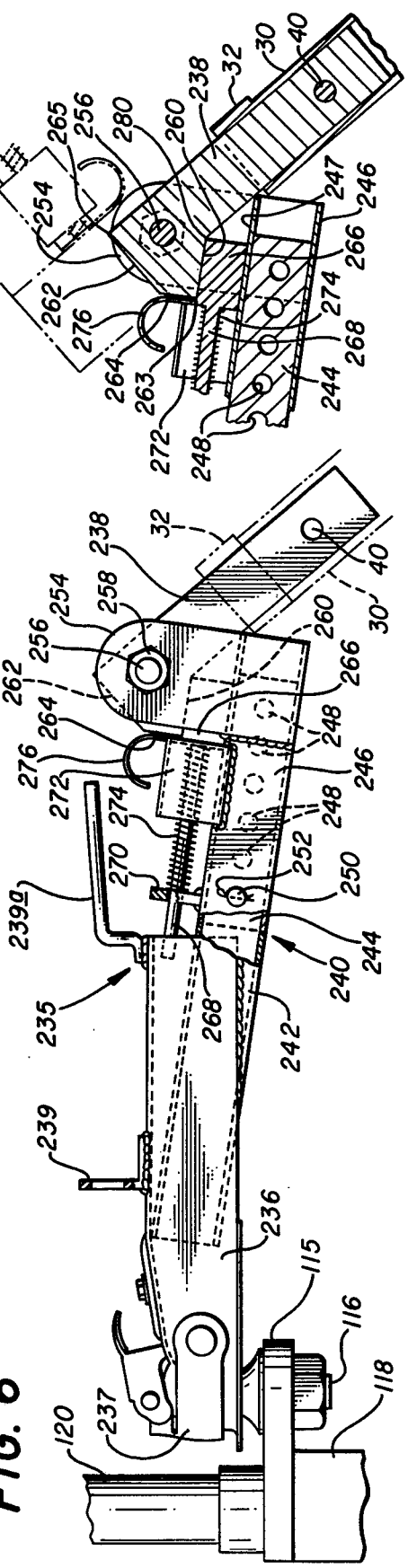
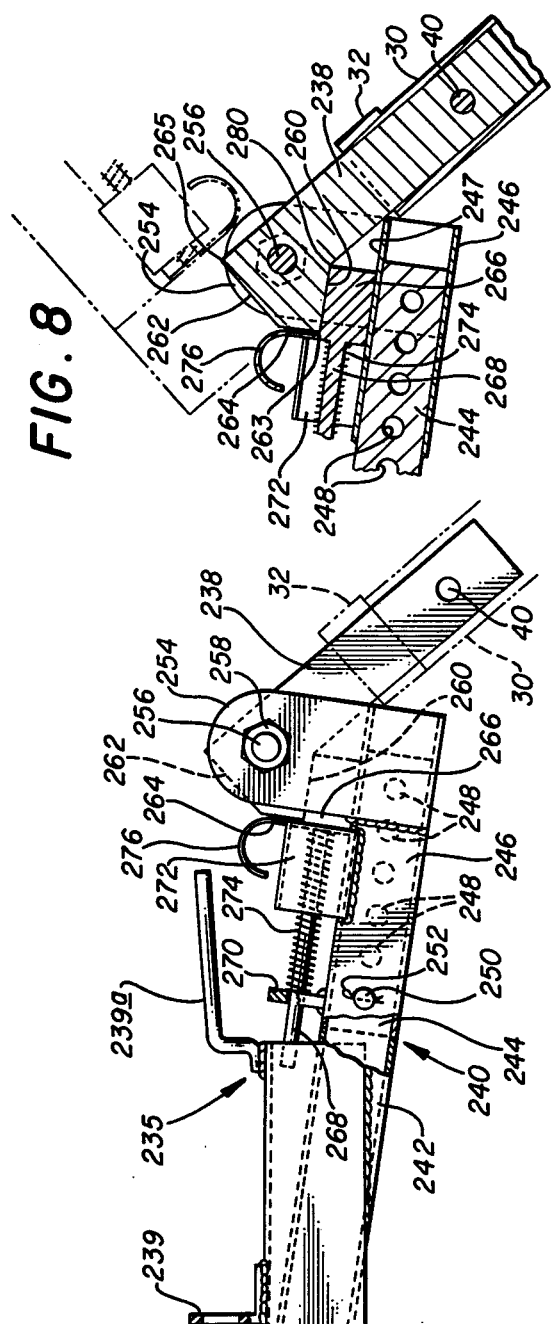
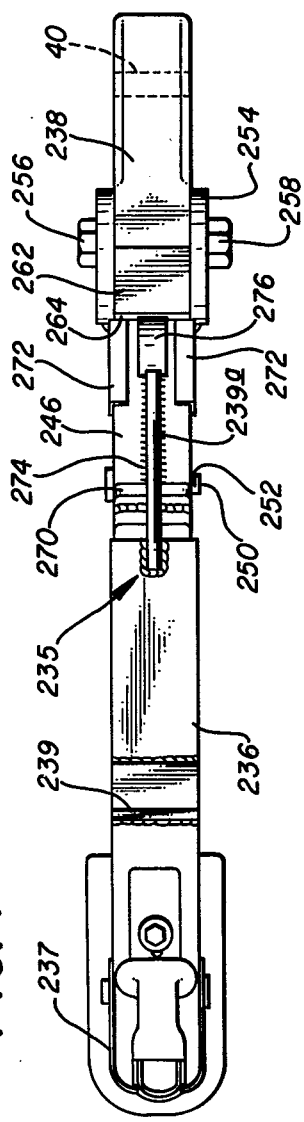
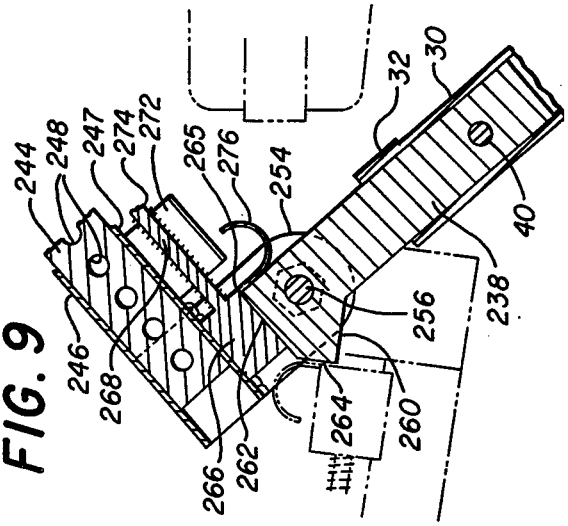

TOW BAR FOR VEHICLES

CROSS-REFERENCE TO RELATED APPLICATION

This application is a continuation-in-part of my co-pending application Ser. No. 894,783, filed Apr. 10, 1978, entitled "Vehicle Tow Bar".

BACKGROUND OF INVENTION

Various types of tow bars have been devised heretofore which are connectable to the front end of an automobile to permit towing the automobile behind another vehicle.

One such device has comprised a bumper support connectable to the front bumper of the towed vehicle, the bumper support having a tongue extending forwardly from the towed vehicle and connectable to the trailer hitch of a towing vehicle. Such devices must be removed to permit use of the towed vehicle or the tongue must be pivoted upwardly and somehow secured to prevent engagement with the ground.

Other vehicle towing devices are disclosed in U.S. Pat. No. 2,183,478; U.S. Pat. No. 3,784,036; U.S. Pat. No. 3,885,815 and U.S. Pat. No. 4,000,823.

When a vehicle is being towed, if the drive wheels of the towed vehicle are in rolling engagement with the roadway, the universal joints and transmission of the vehicle may experience unnecessary wear. Further, since the odometer of the vehicle generally registers rotation of the drive wheels, the odometer indicates that the vehicle has been driven a distance which is equal to the sum of the distance actually driven plus the distance which the vehicle has been towed. This results in substantial reduction of the resale value of the vehicle.

Heretofore, it has been necessary to raise the frame of the towed vehicle a substantial distance above the roadway to assure clearance of the wheels of the vehicle because springs urge the front wheels downwardly when the frame of the vehicle is elevated.

SUMMARY OF INVENTION

The invention disclosed herein is a vehicle tow bar comprising a tongue connectable to the frame or motor support and wheel support members of a vehicle which is to be towed. The front end of the tongue has an upwardly inclined tongue extension connector secured thereto for receiving a tongue extension piece having a coupling secured to the outer end thereof. The tongue extension piece is detachably secured to the tongue extension connector so that the coupling and tongue extension piece can be removed from the tongue when the vehicle is being driven. However, since the tongue extension connector is upwardly inclined the outer end of the tongue extension piece and the coupling are elevated above the roadway a sufficient distance so as to not engage the roadway when the vehicle is being driven.

A suspension support beam is secured to the rear end of the tongue and has a pair of bell cranks pivotally secured thereto for actuating suspension support pins moveably secured to opposite ends of the suspension support beam. An actuating rod is connected to the bell cranks and extends to a position excessible from the front end of the vehicle for actuating the suspension support pins between a first position spaced from the vehicle suspension mechanism and a second position engaging the vehicle wheel support suspension mechanism.

A primary object of the invention is to provide a vehicle tow bar connectable to a towed vehicle to permit normal use of the towed vehicle and to support the drive wheel suspension of the vehicle when the vehicle is being towed.

Another object of the invention is to provide a vehicle tow bar having a tongue and stabilizer beam connectable to the vehicle and having a tongue extension piece detachably secured to the tongue to permit removal of a coupling from the vehicle tow bar when the vehicle is being driven.

Another object of the invention is to provide a vehicle tow bar comprising a tongue connectable to a vehicle, the tongue having an upwardly inclined tongue extension connector on the end thereof for maintaining a trailer hitch coupling in an elevated position above the roadway when the vehicle is being driven.

A further object of the invention is to provide a vehicle tow bar which is connectable to a vehicle to be towed without modification of the vehicle.

A still further object of the invention is to provide a device engageable with the wheel suspension system of the vehicle for maintaining the wheels of the vehicle in an elevated position when the vehicle is being towed, the device being actuatable by a actuating lever accessible from the periphery of the vehicle.

A still further object is to provide an improved vehicle tow bar and trailer hitch, the trailer hitch pivotally supporting a winch having a cable connectable to the tow bar in a position to permit elevating the vehicle tow bar and subsequently moving the vehicle tow bar laterally for aligning a coupling on the tow bar vertically above a coupling hitch ball secured to the trailer hitch.

Other and further objects of the invention will become apparent upon referring to the detailed description hereinafter following and to the drawings annexed hereto.

DESCRIPTION OF THE DRAWING

Drawings of a preferred embodiment of the invention are annexed hereto so that the invention may be better and more fully understood, in which:

FIG. 4 is a perspective view of the vehicle tow bar, the vehicle tow bar being detached from the towed vehicle;

FIG. 5 is a cross-sectional view taken along line 5—5 of FIG. 4;

FIG. 6 is a fragmentary side elevational view of a modified form of the tongue extension piece;

FIG. 7 is a plan view thereof;

FIG. 8 is an enlarged fragmentary side elevational view of the pivot showing the tongue extension piece in a horizontal position; and FIG. 9 is an enlarged fragmentary side elevational view similar to FIG. 8 showing the tongue extension piece in a vertical stored position.

Numeral references are employed to designate like parts throughout the various figures of the drawing.

DESCRIPTION OF A PREFERRED EMBODIMENT

Figures 1, 2:
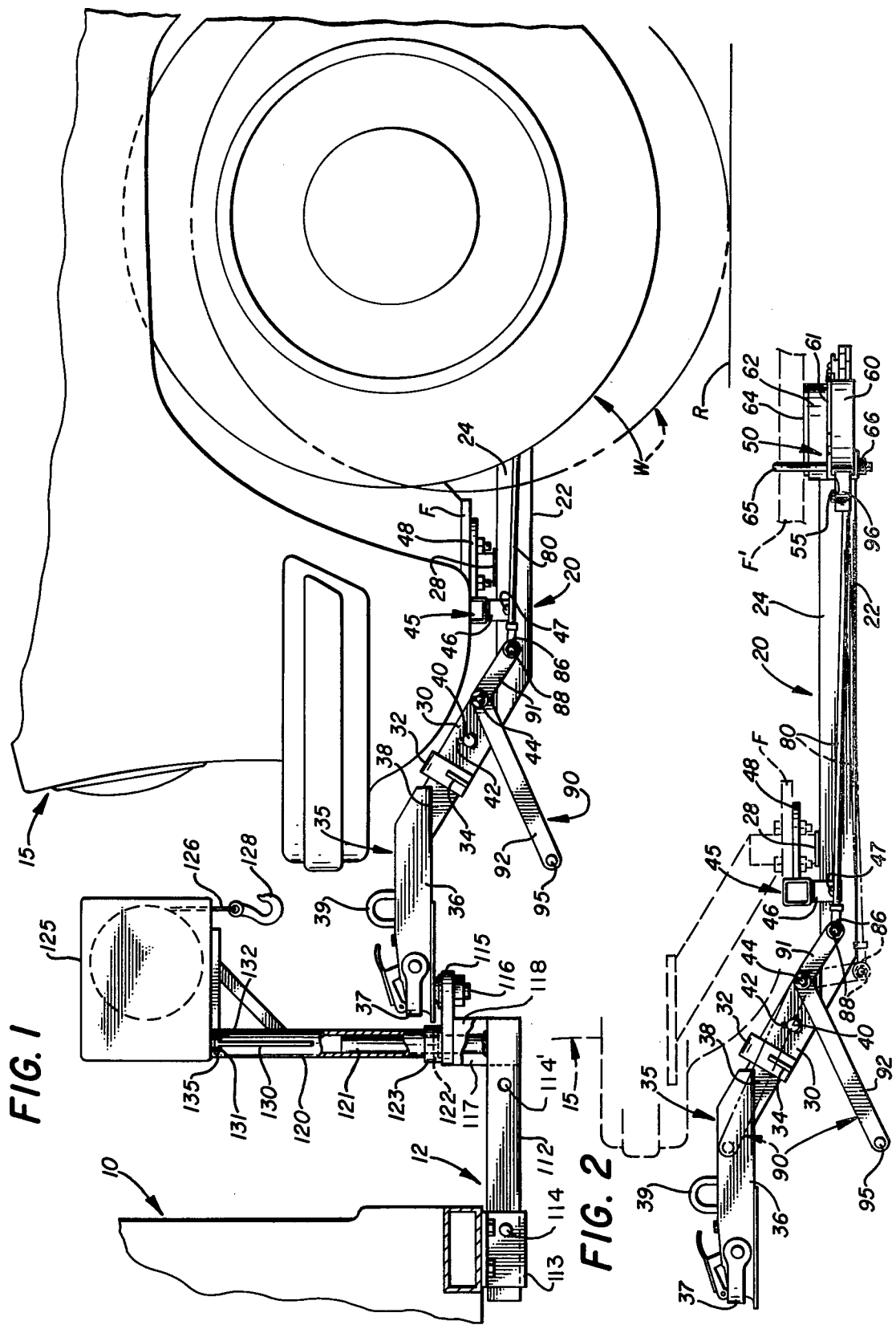
FIG. 1 is a fragmentary side elevational view of the front of a towed vehicle and the rear end of a towing vehicle, the improved vehicle tow bar and hitch extending therebetween.
FIG. 2 is a side elevational view of the vehicle tow bar.

Referring to FIG. 1 of the drawing the numeral 10 generally designates a towing or draft vehicle having a hitch generally designated by the numeral 12 secured to the rear end thereof. A towed vehicle generally designated by the numeral 15 has a tow bar 20 secured thereto and connectable to the hitch 12 on the towing vehicle.

The towed vehicle 15 is of conventional design and is intended to illustrate a front wheel drive vehicle, for example of the type commercially available under the trademark "Honda".

The front wheels of a front wheel drive vehicle are supported on control arms, stabilizer bars, shock absorbers, springs or torsion bars, the wheel being driven by a driven axle which is powered by the engine of the vehicle through a transmission.

The under structure of front wheel drive vehicles is well known to persons skilled in the art and further description thereof is not deemed necessary.

Referring to FIGS. 4 and 5 of the drawing, tow bar 20 comprises a tongue 22 having an upwardly extending flat plate 24 welded or otherwise secured to one edge thereof and a second flat plate 26 welded or otherwise secured to an edge thereof adjacent the front end 22a of the tongue 22. Plates 24 and 26 have bearing pads 28 welded or otherwise secured to upper surfaces thereof.

A tongue extension connector 30, comprising a hollow tubular member, is secured to the outer end 22a of tongue 22. As best illustrated in FIG. 2 of the drawing the tongue extension connector 30 is deflected upwardly at an angle of approximately 30° relative to tongue 22. As will be hereinafter more fully explained, an actuating lever retainer collar 32 is secured to the outer end of a tongue extension connector 30 and has an actuating lever retainer lug 34 secured thereto.

A tongue extension piece generally designated by the numeral 35 comprises a horizontally disposed portion 36 and a downwardly extending inclined portion 38. The downwardly inclined portion 38 is adapted to be telescopically received in the hollow tubular extension connector 30 and is detachably secured thereto by an extension connector pin 40 extending through aligned apertures in opposite sides of tubular member 30 and in the inclined portion 38 of the tongue extension piece 35. Thus, pin 40 limits longitudinal movement of portion 38 of tongue extension piece 35 relative to tongue extension connector 30. A cotter key 42 or other suitable locking means is connected to the end of extension connector pin 40 to prevent accidental removal thereof, as for example as a result of vibration.

As will be hereinafter more fully explained, a stub axle 44 extends outwardly from tongue extension connector 30. However, stub axle 44 does not extend into the interior of tubular connector 30 so as to interfere with movement of portion 38 of tongue extension piece 35 relative to connector 30.

The horizontally disposed outer end 36 of tongue extension piece 35 has a trailer hitch coupling 37 secured to the outer end thereof, the coupling 37 having a socket therein to receive a hitch ball secured to a trailer hitch.

The internal structure of the trailer hitch coupler 37 is well known to persons skilled in the art.

A lifting eye 39 extends upwardly from the upper surface of the horizontally disposed portion of tongue extension piece 35 to facilitate attaching the coupler 37 to the hitch ball on a trailer hitch as will be hereinafter more fully explained.

Spaced plates 24 and 26 secured to edges of tongue 22 have apertures extending therethrough to receive bolts for securing tongue 22 to a hollow tubular rectangular stabilizer beam 45. Angle supports 46 are welded or otherwise secured in spaced apart relation to stabilizer beam 45 and have apertures extending therethrough. Bolts 48 extend through apertures in angle supports 46 and in plates 24 and 26 for securing stabilizer beam 45 to the tongue 22. Mounting plates 48 having apertures 49 formed therein are welded or otherwise secured to opposite ends of stabilizer beam 45 to facilitate attaching the stabilizer beam to a frame member F on the chassis of vehicle 15.

While stabilizer beam 45 is illustrated as a substantially straight tubular member in FIG. 4 of the drawing, it will be appreciated that it may be necessary to shape the stabilizer beam to pass around obstructions which extend downwardly from the chassis of vehicles constructed by various manufacturers.

A mounting bracket 52 is secured to the inner end 22b of tongue 22 and to a central portion of suspension support beam 50.

Mounting bracket 52 comprises an angle member having right angularly disposed flanges 53 and 54 and having a lug 51 welded thereto.

Flange 54 of mounting bracket 52 is welded or otherwise secured to a central portion of suspension support beam 50 and lug 51 and flange 53 are detachably secured to plate 24 and tongue 22, respectively, by bolts 55.

Figure 3:
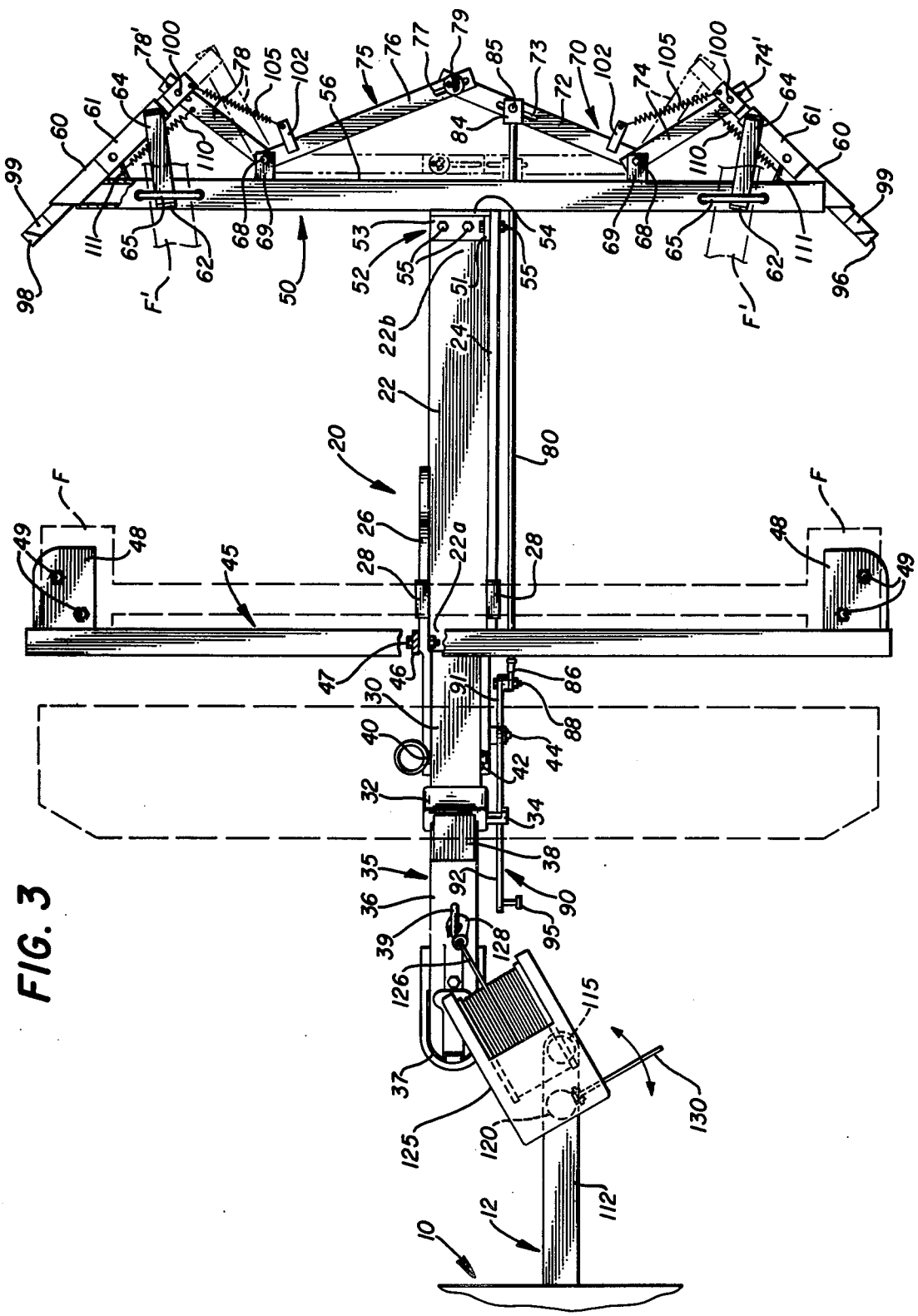
FIG. 3 is a top plan view of the vehicle tow bar, the vehicle tow bar being detached from the towed vehicle.

As best illustrated in FIGS. 3 and 4 of the drawing, suspension support beam 50 preferably comprises a hollow, tubular member having a rectangular or square cross-section.

A hollow, tubular sleeve 60 is welded or otherwise secured to each end of support beam 50. In the illustrated embodiment, a portion of the rear side wall 56 of tubular support beam 50 has been cut away such that a hollow tubular rectangular shaped sleeve 60 is positionable between upper and lower walls of the tubular support beam 50 and held in position as by welding.

As illustrated in FIG. 4, each of the hollow tubular sleeves 60 has a spacer 61 welded to an upper surface thereof, spacer 61 being welded to a lower surface of support strut 62. Each support strut 62 is welded or otherwise secured to suspension support beam 50 slightly inwardly from the end of the support beam so as to form a truss-like support structure for stabilizing the hollow tubular sleeves 60. Each of the support struts 62 preferably has a wear plate 64 secured to the upper surface thereof.

Shackles 65 are provided adjacent opposite ends of support beam 50 to facilitate attaching beam 50 to frame members F' of the chassis of the vehicle. In the particular embodiment of the invention illustrated in FIG. 4 of the drawing, shackles 65 comprise U-bolts which extend through spaced apertures adjacent opposite sides of support struts 62. It should be readily apparent that when U-bolts 65 are positioned over frame members F', nuts 66 can be threadedly secured to lower ends of the U-bolt for urging wear plates 64 into engagement with lower surfaces of frame members F' to thereby attach suspension support beam 50 to the chassis of the vehicle.

As best illustrated in FIGS. 3 and 4 of the drawing, a pair of bell cranks 70 and 75 are pivotally secured by pins 68 to lugs 69 secured to the rear wall 56 of suspension support beam 50.

Bell crank 70 comprises a first crank arm 72 having a slot 73 formed intermediate opposite ends thereof and a second crank arm 74 rigidly secured to the first crank arm 72 and angularly disposed relative thereto.

Bell crank 75 comprises a first crank arm 76 having a slot 77 formed therein adjacent the outer end thereof and a second crank arm 78 rigidly secured to the first crank arm 76.

The end of the first crank arm 72 of bell crank 70 has an aperture formed therethrough through which a bolt or pivot pin 79 extends. Pivot pin 79 also extends through slot 77 formed in arm 76 of bell crank 75 such that crank arms 72 and 76 are pivotally and slideably secured together.

An actuating rod 80 extends through an aperture 82 formed in suspension support beam 50 and has a clevis 84 secured to one end thereof. A pin 85 extends through aligned openings formed in clevis 84 and through slot 73 formed in the arm 72 of bell crank 70 for pivotally and slideably connecting actuating rod 80 to the bell crank 70.

A rod eye 86 is threadedly secured to the other end of actuating rod 80 and is pivotally secured by a bolt 88 to an actuating lever 90 pivotally secured to stub axle 44 mounted on tongue extension connector 30, as hereinbefore described.

Actuating lever 90 comprises a first link 91 which is pivotally secured by bolt 88 to rod eye 86 and a second link 92 having a handle 95 secured to the outer end thereof.

As will be hereinafter more fully explained, retainer lug 34 on collar 32 secured to tongue extension connector 30 is positioned to engage and lock link 92 in a raised position.

From the foregoing it should be readily apparent that movement of handle 95 imparts movement through actuating lever 90, actuating rod 80, bell cranks 70 and 75 to suspension support pins 96 and 98 slideably disposed in hollow tubular sleeves 60 secured to opposite ends of suspension support beam 50.

Each of the suspension support pins 96 and 98 has a groove or cradle 99 formed therein to engage and support a structural element such as a suspension strut (not shown) incorporated in the wheel suspension system of the vehicle.

The second crank arm 74 on bell crank 70 and the second crank arm 78 on bell crank 75 have slots 74' and 78', respectively, formed therein through which pivot pins 100 extend for hingedly connecting suspension support pins 96 and 98 to the bell cranks 70 and 75.

Each of the first crank arms 72 and 76 has an anchor ear 102 secured thereto and a spring 105 is secured to an outer end of each anchor ear 102 and to a lug 106 on suspension support pin 96 or 98.

Each of the second crank arms 74 and 78 has an aperture formed therein into which one end of a spring 110 extends. The opposite end of each spring 110 is secured to a member 111 secured to sleeve 60 adjacent the end of suspension support beam 50.

As best illustrated in FIG. 3 of the drawing, when handle 95 is moved upwardly from the position illustrated in FIG. 4 of the drawing, crank arms 74 and 78 move from the position shown in full outline in FIG. 3 to the position shown in dashed outline in FIG. 3. Thus, when handle 95 is moved upwardly springs 110 will be lengthened while springs 105 will become shorter.

Springs 110 bias suspension support pins 96 and 98 to the extended position shown in full outline in FIG. 3 of the drawing.

In view of the foregoing, it should be readily apparent that the vehicle tow bar 20 can be mounted on a vehicle without substantial modification of the vehicle. It is not necessary that the tow bar 20 be removed from the vehicle to permit driving the vehicle in conventional manner. When link 92 is moved from the position illustrated in FIG. 4 of the drawing to a raised position and retained in the elevated position by retainer lug 34, suspension support pins 96 and 98 will be retracted into sleeves 60 so as to not interfere with operation of the suspension system of the vehicle.

When the vehicle is to be towed, while wheels W on the vehicle 15 are in engagement with the roadway, handle 95 will be disengaged from retainer lug 34 thereby causing springs 110 to exert force on bell cranks 70 and 75 for moving pins 96 and 98 to the extended position illustrated in FIG. 3 of the drawing. When pins 96 and 98 are in the extended position the front suspension system of the vehicle is engaged to prevent movement of wheels W when the coupler 37 on tongue extension piece 35 is attached to a hitch on another vehicle. Referring to FIG. 1 of the drawing, if suspension support pins 96 and 98 are not extended prior to elevating extension portion 35, the wheels W would remain in engagement with the surface of the roadway R as shown in dashed outline unless the front of the vehicle is raised several inches higher to exert force through the springs of the vehicle to lift the wheels W.

Referring to FIG. 1 of the drawing, the hitch 12 is of improved construction and is particularly adapted for use in connection with the tow bar 20 hereinbefore described. The combination of the specific hitch 12 and tow bar 20 is adapted to facilitate attaching the tow bar to the trailer hitch.

The hitch 12 generally comprises a draw bar 12 which is slideably disposed in a draw bar support sleeve 113 secured to the frame of the draft vehicle 10 by any suitable means, such as bolts. Draw bar 112, illustrated in an extended position in FIG. 1 of the drawing, has at least two apertures 114' extending therethrough. A draw bar anchor pin 114 is positionable through apertures 114' in draw bar support sleeve and in draw bar 112 for locking draw bar in the extended position as illustrated in FIG. 1 or in a retracted position by moving draw bar 112 inwardly through draw bar support sleeve 113.

A hitch mounting plate 115 is welded or otherwise secured to the upper ends of vertically extending spacer plates 117 and 118 which are welded or otherwise secured to the outer end of draw bar 112. Spacer plate 115 has a hole formed therein to receive the shank on the end of a conventional hitch coupling ball 116.

Hitch mounting plate 115 has a further aperture formed therethrough between the upper ends of spacer plates 117 and 118 through which a pivot post 121 extends. The lower end of pivot post 121 is welded or otherwise secured to the upper surface of draw bar 112. The upper end of pivot post 121 extends into a hollow tubular stanchion 120, the lower end of stanchion 120 resting upon a thrust bearing 122 positioned between the lower end of stanchion 120 and the upper surface of hitch mounting plate 115. A dust cover 123 is positioned to enclose thrust bearing 122.

A winch 125 is secured to the upper end of stanchion 120. Winch 125 preferably is driven by, for example a 12 volt electric vehicle battery, and is controlled by a three-way power switch having a raise, stop, and lower position. However, it should be appreciated that winch 125 may be manually or hydraulically driven. Winch 125 has a cable 126 and a lifting hook 128 positionable in lifting eye 39 on the horizontally disposed portion 36 of tongue extension piece 35.

A handle 130 is pivotally secured between lugs 131 and 132 by a pin 135. Lugs 131 and 132 are welded or otherwise secured to the upper end of stanchion 120 or to the housing of winch 125.

Referring to FIGS. 1 and 3 of the drawing, it should be noted that when cable 126 extends vertically downwardly from winch 125 to engage lifting eye 39, the hitch ball 116 and coupling 37 are positioned between the lifting eye 39 and stanchion 120.

As illustrated in FIG. 3 of the drawing, when coupler 37 is positioned adjacent coupling ball 116, handle 130 can be pivoted upwardly to facilitate rotating stanchion 120. When lifting hook 128 is positioned in lifting eye 39 and winch 125 is employed for elevating the tow bar 20, hitch coupler 37 will be laterally spaced from coupler ball 116. Handle bar 130 may then be employed for rotating stanchion 120 and coupler 37 to a position vertically above coupler ball 116. When winch 125 is reversed, coupler 37 will move downwardly to receive coupler ball 116.

As hereinbefore noted, if vehicle 15 is not being towed, the vehicle may be driven without removing tow bar 20 from the vehicle. If it is deemed expedient to do so, the tongue extension piece 35 may be disconnected from tongue extension connector 30 by removing extension connector pin 40 such that the downwardly inclined portion 38 of tongue extension piece 35 can be removed from the hollow upwardly inclined portion of tongue extension connector 30.

MODIFIED EMBODIMENT

As best illustrated in FIGS. 6-9 a modified form of the tongue extension piece, generally designated 235, is illustrated.

The tongue extension piece 235 generally comprises a horizontally disposed portion 236 and a downwardly extending inclined portion 238. A central portion 240 connects the horizontally disposed portion 236 and downwardly inclined portion 238. The downwardly inclined portion 238 is secured to tongue extension connector 30 by pin 40 as previously described in the first embodiment.

Central portion 240 generally comprises a first hollow tubular section 242 rigidly secured to the generally horizontal portion 236. A rigid bar 244 is rigidly secured in the first tubular section 242 and slideably disposed within the second tubular central portion 246. A plurality of apertures 248 are formed in the end of the bar 244 adjacent downwardly inclined portion 238. A pin 250 extends through one of the passages 248 and a passage formed in tubular section 246 relative to the bar 244. A cotter pin 252 secures the pin 250 within the passage.

A clevis 254 is rigidly secured to the outer end of tubular section 246 about the end of inclined portion 238 and is pivotally secured thereto by bolt 256 and nut 258. The upward end of inclined portion 238 has a first lower surface 260 and a second inclined upper surface 262 joined by a central surface 264 to form an outwardly extending dog which extends toward the coupling 237. The dog prevents the tongue extension piece 235 from pivoting from a generally horizontal position as illustrated in FIG. 6 to a generally vertical position as partially illustrated in FIG. 9.

Means to limit rotation of the tongue extension piece 235 about bolt 256 generally comprises a wedge block 266 having a shaft 268 secured to one end and extending through guide bushing 270. Guides 272 are secured to the upper portion of tubular section 246 to guide wedge block 266 longitudinally along the upper surface 247. A spring 274 is disposed between guide bushing 270 and the end of block 266 to urge the block 266 toward inclined portion 238. A pull 276 is provided for pulling the block 266 outwardly toward guide bushing 270 and limits travel of block 266 under portion 238.

As best illustrated in FIGS. 6 and 8, when the tongue extension piece 235 is in a generally horizontal position, shown a full outline, the block 266 is urged between lower surface 260 of inclined portion 238 and surface 247 of section 246. This positions the upper surface of the block 266 against surface 260 and the lower surface of block 266 against the upper surface of tubular member 246 urging corner 280 against portion 238 and locking same in position.

To move the tongue extension piece 235 to the vertical position for storage while the vehicle is not being towed, the pull 276 is gripped and pulled to withdraw block 266 through guides 272 against the spring 274. Once the block 266 has cleared surface 264, the tongue extension piece 235 may be pivoted upwardly on bolt 256 to a vertical position. The block 266 is then released and slides between upper surface 262 and the upper surface 247 of tubular section 246. This prevents rotation of tongue extension connector 235 about the axis of bolt 256 due to the dog formed by central surface 264.

The length of the central portion of tongue extension piece 235 may be adjusted by telescopically moving bar 244 out of tubular section 246, thus allowing the distance between the vehicle and the hitch 118 of the towing vehicle to be adjusted to accommodate different size vehicles. A lifting eye 239 is provided for ease in handling a tongue extension piece 235 and a handle 239a aides in pivoting the central portion 240 about bolt 256.

It should be readily apparent from the foregoing that surface 260 is parallel to the upper surface 247 of tubular section 246 when tongue extension piece 235 is in the first position shown in FIG. 8 and that surface 262 is parallel to upper surface 247 of tubular section 246 when tongue extension piece 235 is in the vertical position illustrated in FIG. 9.

Block 266 has parallel sides therefore the parallel sides 260 and 247 engage block 266 and no force is exerted to move the block 266 longitudinally along section 246. Corner 263 between surfaces 260 and 264 engages the upper surface of block 266 to limit rotation when tongue extension piece 235 is in the horizontal position. Corner 265 engages the upper surface of block 266 to limit downward rotation. The block 266 provides a means to limit rotation of the tongue extension piece 235 about shaft 256.

Having described my invention, I claim:

1. Apparatus for detachably securing a vehicle to be towed to a hitch on a towing vehicle comprising: a generally inclined vertically extending member, said vertically extending member having an upper end with a dog formed thereon to form a first lower surface and a second inclined upper surface; means securing said inclined vertically extending member to the chassis of said towed vehicle; connector means pivotally secured to the upper end of said inclined vertically extending member adjacent the dog formed thereon; hitch coupling means secured to the outer end of said connector means to engage the hitch on the towing vehicle; and a block slideably disposed along said connector means adapted to slide between the lower surface formed on said dog of said inclined vertically extending member and the upper surface of said connector means when the connector means is secured in a generally horizontal position for connecting to a hitch, said block being adapted to be withdrawn from between said first lower surface of the dog and the connector means to enable said connector means to be pivoted to a generally vertical position with the block then being slideably disposed between the second inclined upper surface of said dog and the upper surface of said connector means to limit pivotal movement downwardly.

2. The combination called for in claim 1 wherein said connector means comprises: a generally horizontally disposed portion having a clevis formed on a first end and a second end secured to said hitch coupling means, the inclined vertically extending member being pivotally secured within said clevis such that the horizontally extending member pivots about said inclined vertically extending member to the generally vertical position.

3. The combination called for in claim 2 wherein said generally horizontally extending member comprises a first tubular section slideably disposed over a second portion of the tubular section; and means to secure said first tubular section to said second tubular section such that the length of said horizontally extending portion may be adjusted.

4. The combination called for in claim 1 with the addition of: guide means secured to the upper portion of said connector means adapted to guide said block; and means to urge said block toward said vertically extending member.

5. The combination called for in claim 1 with the addition of: a suspension support beam; means securing said suspension support beam to a tongue; suspension support pins; means moveably securing said suspension support pins to each end of said suspension support beam; actuating means secured to said suspension support beam and associated with said suspension support pins for moving said suspension support pins between a first position spaced from the wheel suspension mechanism of the towed vehicle, and a second position engaging the wheel suspension support mechanism of the towed vehicle.

* * * * *